Aug. 28, 1945.  W. J. ELVIN ET AL  2,383,537
TENSION INDICATOR
Filed Sept. 9, 1943
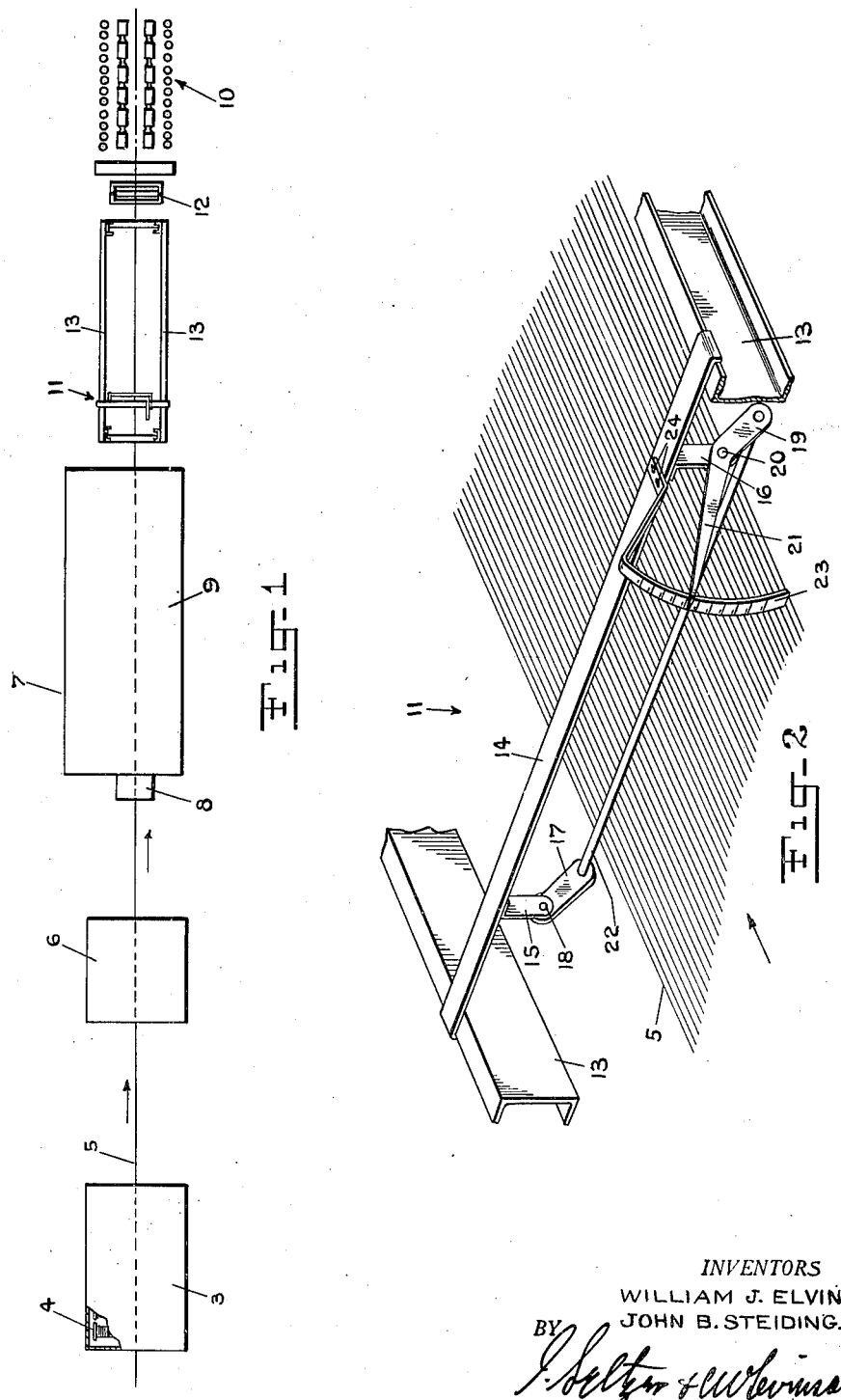
INVENTORS
WILLIAM J. ELVIN.
JOHN B. STEIDING.
BY
ATTORNEYS.

Patented Aug. 28, 1945

2,383,537

UNITED STATES PATENT OFFICE 2,383,537

TENSION INDICATOR

William J. Elvin, Frostburg, and John B. Steiding, Midland, Md., assignors to Celanese Corporation of America, a corporation of Delaware Application September 9, 1943, Serial No. 501,650

2 Claims. (Cl. 73—144)

This invention relates to improvements in the stretching of filamentary materials and relates more particularly to an improved tension indicating device particularly adapted for use in connection with the controlled stretching of traveling filaments, yarns or threads, hereinafter referred to as threads, while they are under the influence of a softening medium.

In stretching operations involving the treatment of threads having a basis of a thermoplastic material with a softening medium with the simultaneous application of tension to said softened threads, efficiency and economy demand that a large number of ends be treated in a single, continuous operation. In the stretching operation, the ends are drawn from a suitable source of supply, formed into a warp, drawn through a multi-end stretching chamber in which a softening medium is present and, after the application of tension sufficient to stretch the softened threads to the desired extent, the individual stretched ends are packaged separately. At the beginning of the stretching operation, the threads are not immediately subjected to the maximum degree of stretch. Both the tension and the supply of softening medium are increased gradually as the stretching operation is initiated until the desired degree of stretching is imparted to the ends. When this point is reached, the stretching conditions are maintained constant and the threads are continuously stretched to the degree desired. The coordination of the gradually increasing softening action on the threads with an increase in tension on starting up the stretching mechanism, requires the services of unusually skilled personnel. Too rapid an increase in tension results in a large number of broken ends. This not only means that a substantial amount of thread is wasted, but the stretching mechanism operates uneconomically at far below normal capacity due to the many broken ends which are not being stretched. If the thread is softened too rapidly without a corresponding and carefully controlled increase in take-up speed the thread may be unduly softened and may be excessively and unevenly stretched or else the ends become entangled in guides or may wind unevenly when taken up in package form.

It is, therefore, an important object of this invention to provide an improvement in stretching apparatus for the multi-end stretching of threads having a basis of a thermoplastic material which will eliminate the above-mentioned and other difficulties encountered in multi-end stretching operations.

Another object of this invention is the provision of an improved tension indicating attachment for multi-end thread stretching devices whereby the tension on the threads undergoing stretching may be closely controlled and coordinated with the softening of said threads.

A further object of this invention is the provision of a novel tension indicating attachment for multi-end thread stretching devices which enables the tension on the threads undergoing stretching to be determined within precise limits by simple visual inspection.

Other objects of this invention will appear from the following detailed description and drawing.

In the drawing, wherein there is shown one embodiment of our invention,

Fig. 1 is a diagrammatic view of a multi-end thread stretching apparatus showing our novel tension indicating attachment in operative position relative to the threads undergoing stretching in the stretching chamber, and Fig. 2 is a perspective view, on an enlarged scale, of our novel tension indicating attachment.

Like reference numerals indicate like parts throughout both views of the drawing.

Referring now to the drawing, reference numeral 3 indicates a creel containing a plurality of bobbins 4 from which threads 5 are drawn, each bobbin supplying a single end of thread. The creel may contain one hundred or more bobbins supplying one hundred or more ends for simultaneous stretching. While the source of supply here is shown as a bobbin, it is to be understood that any other thread packages may be employed or that the threads may come directly from the metier. Threads 5 are then passed through a trough 6 containing a suitable liquid for washing out or removing from the thread any undesired substance such as, for example, residual solvent. The threads leaving trough 6 are then passed into an enclosed treating chamber or series of chambers, generally indicated by reference numeral 7, where the threads are subjected to the action of a softening medium, the treating chamber being provided with suitable orifices through which the ends are run.

Where steam is employed as the softening medium the treating chamber may include a water compartment 8 and a steam compartment 9. The water in compartment 8 is circulated therethrough at an elevated temperature and in compartment 9 the steam is under pressure and at a temperature sufficiently high to exert the desired softening action on the threads 5. The softened threads are stretched by the tension exerted thereon by means of a take-up device generally indicated by reference numeral 10. In travelling to the take-up device, the threads pass over our novel tension indicating attachment 11 and over a roll 12 for applying such thread conditioning agent as may be desired.

The thread tension indicating device 11 is shown in detail in Fig. 2 of the drawing. The tension indicating device is shown supported on channel members 13 by means of a crosspiece 14, the latter being fixed conveniently to the channel members 13 in such a manner that the entire tension indicating device 11 may be shifted along said members to any desired position. Attached to cross-piece 14 as by welding, bolts, or the like and extending downwardly therefrom are supporting brackets 15 and 16. Bracket 15 has fixed thereto a link 17 which is free to pivot at 18, while bracket 16 has fixed thereto a link 19 pivoted at 20. Link 19 is formed in such a manner that it is integral with a pointed indicator arm 21. Set in links 17 and 19 and supported at each end thereby is a smooth, highly polished rod 22, of glass, stainless steel or other suitable material, which is adapted to ride on threads 5 when sufficient tension is exerted on the travelling threads to cause them to come in contact with said rod. Any variations in the tension exerted on threads 5 causes rod 22 to move and the movements of rod 22 are transmitted by the motion of link 19 to indicator arm 21. Arm 21 moves relative to and cooperates with an indicating scale 23, calibrated in the desired units. Scale 23 is mounted on cross-piece 14 as by screws 24.

In starting up the stretching device utilizing our novel attachment, an operative is stationed at a geared vari-drive speed control device driving the thread take-up mechanism, i. e. the downstroke twister 10, while another operative is stationed at the water and steam controls. The threads 5 are drawn from the creel 3 by the take-up mechanism 10 and the movement of rod 22 riding on the threads as they move along, causes indicator arm 21 to pivot at 20 and be moved relative to scale 23. The greater the tension on the threads the greater will be the deflection observed. The operative stationed at the steam and water controls then gradually increases the flow of both the steam and water, thus effecting a gradually increasing softening action on the threads. The operative at the speed control must in turn increase the tension or take-up of the threads in strict conjunction or synchronization with the increasing softening action to avoid damaging the threads. Employing our novel attachment, this is accomplished in a very simple manner, as follows. The operative at the speed control merely increases the take-up speed, as the threads become increasingly softened, at such a rate that indicator arm 21 is maintained constantly at a predetermined position on indicator scale 23. Each marking on the calibrated scale indicates a specific degree of tension on the threads. By maintaining the thread tension constant, as indicated on our novel device, while the softening action is simultaneously increased the stretching action may be brought up to maximum stretch by the operative with absolutely no danger of broken ends or of the threads sagging below the tension indicating device 11 and becoming damaged. When the degree of stretching has been advanced to the desired point automatic controllers may be switched on and the stretching carried out without attention.

This invention is applicable to the stretching of thermoplastic threads or threads capable of being softened by solvent vapors and/or liquids and is particularly adapted for use in connection with the stretching of yarns, filaments or threads having a basis of cellulose derivatives such as cellulose esters and cellulose ethers. Examples of cellulose esters are cellulose acetate, cellulose propionate and cellulose butyrate, and mixed esters such as cellulose aceto-propionate and cellulose aceto-butyrate, while examples of cellulose ethers are ethyl cellulose and benzyl cellulose. Yarns, threads, or filaments having a basis of other thermoplastic materials such as, for example, polyvinyl chloride, polyvinyl acetate, copolymers of vinyl chloride and vinyl acetate, and synthetic linear polyamide condensation products, i. e. hexamethylene adipamide, may also be controllably stretched employing our novel attachment. In lieu of employing said novel attachment in connection with stretching operations, it may be employed in various other applications wherein it may be desired to measure and visually indicate yarn tensions.

It is to be understood that the foregoing detailed description is given merely by way of illustration and that many variations may be made therein without departing from the spirit of our invention.

Having described our invention, what we desire to secure by Letters Patent is:

1. A tension indicating device responsive to the tension in a travelling warp of threads, comprising a support, spaced links pivotally mounted on said support, a rod carried by the free ends of and bridging said links, said rod extending across and above the full width of said warp and adapted to be moved thereby, and a pointer movable by said rod, effected by the tension of said warp as a whole, into a visual indication.

2. A tension indicating device responsive to the tension in a travelling warp of threads, comprising a support, spaced links pivotally mounted on said support, a rod carried by the free ends of and bridging said links and extending across and above the full width of said warp and adapted to be moved thereby, and means, including a pointer integral with one of said links, operatively connected with said rod, adapted to translate the movement of said rod, effected by the tension of said warp as a whole into a visual indication.

WILLIAM J. ELVIN.
JOHN B. STEIDING.